J. W. HAGEARTY.
PERCOLATOR.
APPLICATION FILED MAR. 12, 1914.
1,132,472. Patented Mar. 16, 1915.
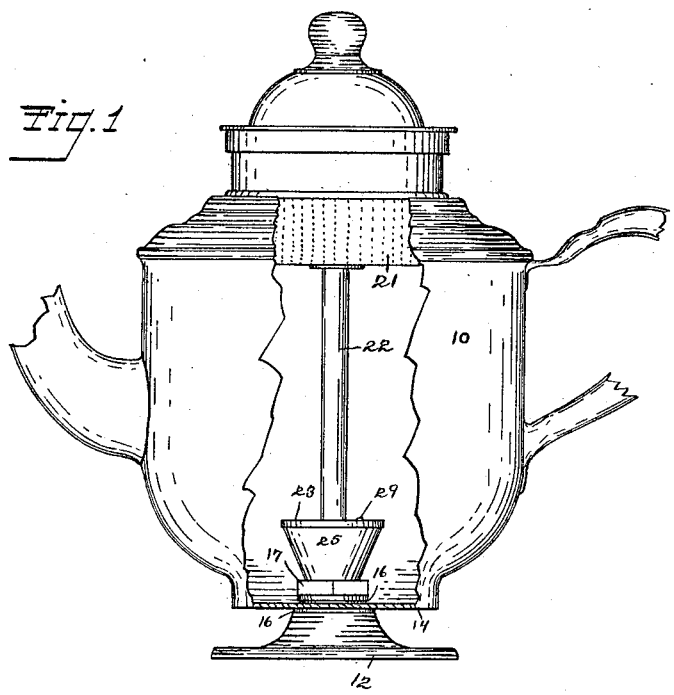
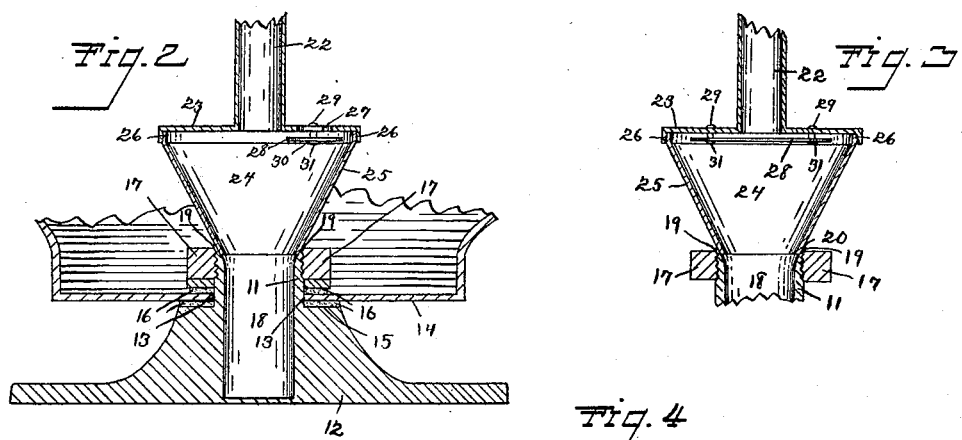
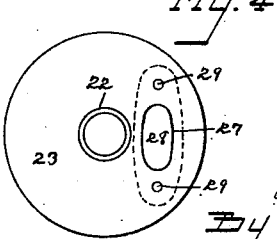
Witnesses:
R. W. Edwards
Geo. D. Morgan
Inventor:
John W. Hagearty
By Louis M. Schmidt
Atty.

UNITED STATES PATENT OFFICE.

JOHN W. HAGEARTY, OF NEW BRITAIN, CONNECTICUT.

PERCOLATOR.

1,132,472. Specification of Letters Patent. Patented Mar. 16, 1915.

Application filed March 12, 1914. Serial No. 824,196.

*To all whom it may concern:*

Be it known that I, JOHN W. HAGEARTY, a citizen of the United States, residing at New Britain, in the county of Hartford and State of Connecticut, have invented certain new and useful Improvements in Percolators, of which the following is a specification.

My invention relates to improvements in percolators, and the object of my improvement is to produce a percolator for the brewing of coffee and the like for use as a beverage and to do this by means that are simple and reliable, and having particular reference to the valve and adjacent parts of such a device.

In the accompanying drawing, Figure 1 is a side elevation of a percolator embodying my invention, being in part broken out. Fig. 2 is a vertical, sectional view, on an enlarged scale, of the lower part of the same. Fig. 3 is a similar view of the same, turned ninety degrees from the position shown in Fig. 2. Fig. 4 is a plan view of part of the same.

My improved percolator comprises a percolator body 10 of ordinary form, having an opening at the top for admitting the tray or basket 21 and having a flat bottom or base 14 to which is secured the heater plate 12. The basket 21 is ordinary and the lower portion thereof is formed of foraminous material. The heater plate 12 has an extended lower portion of the usual form that serves as the supporting foot and as a heat collector, and on the upper portion comprises a platform 15 suitable for a rest for the flat bottom or base 14 of the pot body 10 and a neck 11 extending upwardly therefrom, the body portion of which is a fit for a hole 13 in the said base 14, and the upper end portion of which is provided with a screw thread. A nut 17 engaged with the said screw thread serves to secure the said base 14 in position on the platform 15, and thereby to secure the body 10 to the heater plate 12. Packing washers 16 of suitable material, such as asbestos, may be provided, one above and the other below the base 14 as shown to insure a liquid tight joint, a metallic washer being interposed between the upper asbestos washer 16 and nut 17.

The neck 11 is provided with an axial bore 18 and the said bore 18 extends downwardly into the body of the heater plate 12 and close to the bottom thereof, to provide a heating space for the liquid after the usual manner. The upper end 19 of the bore 18 is flared suitably to form a seat for the correspondingly tapered lower end 20 of the liquid receiving chamber 24 to be described.

The upper portion of the delivery tube 22 and the means of connection of the same with the basket 21, by which the latter is supported are ordinary. The lower end of the said delivery tube 22 terminates at the top wall or roof 23 of the liquid receiving chamber 24. The liquid receiving chamber 24 may be constructed in various ways and constitutes essentially an expansion of the lower end of the delivery tube 22. As shown, the said chamber comprises two parts, respectively, a lower body portion 25 at the lower end and the roof 23 already mentioned at the upper end, and these are united by a screw thread connection 26 provided in overhanging cylindrical flange-like portions. The lower portion 25, below the flange-like screw thread portion mentioned, is conical, tapering inwardly from the upper end downwardly, and terminating at the lower end 20 in the supporting seat, already mentioned. The roof 23 of the liquid receiving chamber 24 as shown is flat, is circular in shape, the delivery tube 22 being positioned at the center thereof, and is of such size as to extend to an appreciable extent laterally relatively to the said delivery tube. The walls of the liquid receiving chamber 24 are formed of sheet material and they inclose a relatively enlarged space suitable for housing an appreciable quantity of liquid, and which connects at the lower end with the liquid heating space 18 and at the upper end with the delivery tube 22.

A valve port 27 for admitting liquid from the body 10 of the pot to the liquid receiving chamber 24 is provided in the roof 23 and the same is controlled by the valve 28. The valve or inlet port 27 is in the form of an elongated opening and the valve 28 is a flat plate, somewhat larger than the said port 27, and normally positioned in suspended relation thereto and below the same sufficiently to permit liquid entering the port 27 to be diverted laterally and thereby be admitted to the interior space of the liquid receiving chamber 24. The means of suspension of the valve 28 comprise a pair of rivets or pins 29 extending downwardly from the roof 23, positioned adjacent the ends of the port 27, passing freely through holes 30 in the valve 28, the lower ends 31 of which are headed suitably to engage with and support the said valve 28. As described, the valve 28 is slidably mounted on the pins 29 so that a slight elevation of the same serves to close the port 27. In use, such elevation of the valve and closing of the port are effected by the increase in pressure in the liquid receiving chamber 24 due to ebullition of liquid in the liquid heating space 18 and the result that follows from this is that liquid displaced by the vapor or steam formed is forced up the delivery tube 22.

It will be noted that the delivery tube 22 and the liquid receiving chamber 24, with the valve 28 incorporated therewith, are removably supported as a unit on the seat 19, so that the same can readily be removed to give access to the valve for cleaning the same if desired. Such cleaning is facilitated by the fact that the side walls of the liquid receiving chamber are conical, and the lower opening is positioned at the apex portion of a conical structure, so that access is given to the lower side of the valve and to the entire interior wall surface from the said opening, a feature that is found advantageous in that all cleaning can be effected readily without disassembling the members that form the said liquid receiving chamber. Furthermore, the exterior of the said apex portion serves as the supporting seat 20 for the said liquid receiving chamber and the delivery tube connected thereto. It will be noted further that except when closed in the manner described the valve is open, so that the normal position of the valve is the open position. Because of this the entrance of liquid from the body of the pot to the liquid receiving chamber is quite unobstructed.

I claim as my invention:—

In a percolator, a liquid receiving chamber having a flat top wall and a delivery tube extending upwardly therefrom, a valve supported from the said top wall, suitable for closing a port in the said top wall, the said valve being in the form of a flat plate having holes in the ends, and the supporting means for the said valve comprising a plurality of headed pins passing through the said holes, extending downwardly from the said top wall, and having the heads at the lower side of the said plate.

JOHN W. HAGEARTY.

Witnesses:
LOUIS M. SCHMIDT,
R. W. EDWARDS.

Copies of this patent may be obtained for five cents each, by addressing the "Commissioner of Patents, Washington, D. C."